Feb. 13, 1923.

J. M. JAMES

DISPENSING DEVICE

Filed Jan. 25, 1922

J. M. James
INVENTOR

BY Victor J. Evans
ATTORNEY

WITNESS:

Feb. 13, 1923.
J. M. JAMES
1,445,594
DISPENSING DEVICE
Filed Jan. 25, 1922
3 sheets-sheet 2
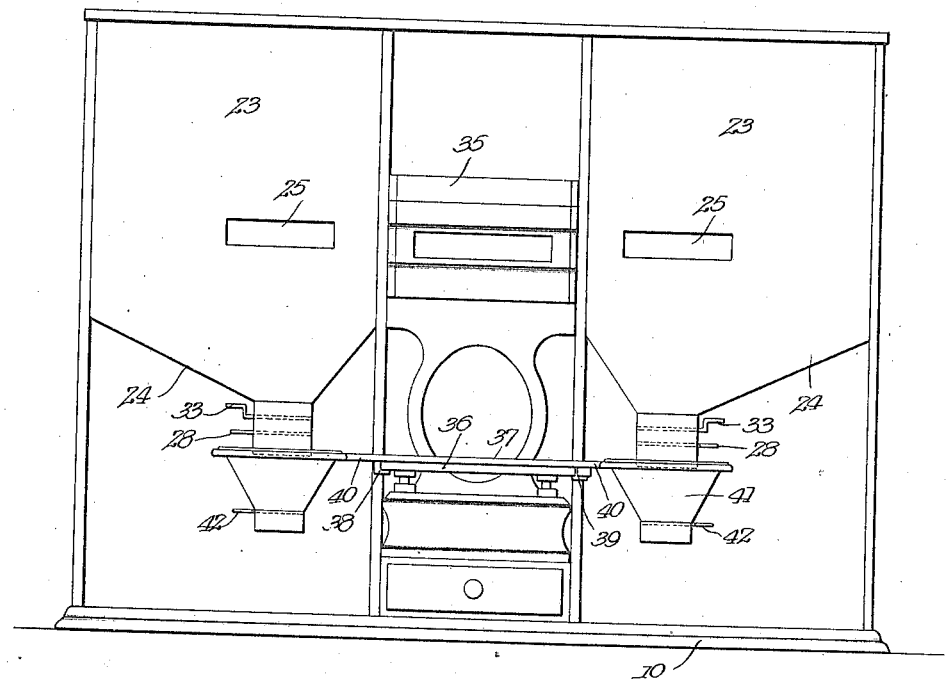
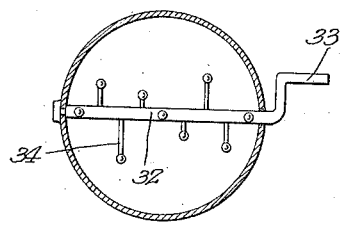
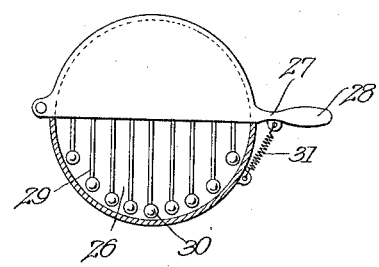

Feb. 13, 1923.

J. M. JAMES 1,445,594

DISPENSING DEVICE

Filed Jan. 25, 1922

Patented Feb. 13, 1923.

1,445,594

UNITED STATES PATENT OFFICE.

JAMES M. JAMES, OF EDGARTON, WEST VIRGINIA.

DISPENSING DEVICE.

Application filed January 25, 1922. Serial No. 531,691.

*To all whom it may concern:*

Be it known that I, JAMES M. JAMES, a citizen of the United States, residing at Edgarton, in the county of Mingo and State of West Virginia, have invented new and useful Improvements in Dispensing Devices, of which the following is a specification.

This invention relates to dispensing devices, particularly to weighers, and has for its object the provision of a device including a plurality of receivers mounted upon the platform of a computing scales and adapted to receive dry material from storage bins or hoppers which may preferably be arranged in cabinet form, the receivers being provided with cut-off valves and the hoppers or bins being likewise provided with cut-off valves, the device operating to facilitate the dispensing of various commodities, inasmuch as a certain quantity may be weighed out accurately and with ease.

Another object is the provision of a device of this character in which any desired number of receivers may be used, each of which may be associated with a separate bin or which may be positioned to receive two or more bins or hoppers.

A further object is the provision of a device of this character in which it is not necessary to detach the receiver (or receivers) in order to weigh on the scale as it does not interfere or restrict in the least from weighing on the plate or main platform of the scale. That is an article, commodity, package, bundle of large size, that is inconvenient to run through the bin into the receiver can be weighed on the plate or platform of the scale with the receiver (or receivers) left intact, without any inconvenience whatever.

An additional object is the provision of a device of this character which will be simple and inexpensive in manufacture, attractive in appearance, sanitary, durable and labor saving in use, and a general improvement in the art.

With the above and other objects and advantages in view, the invention consists in the details of construction to be hereinafter more fully described and claimed and illustrated in the accompanying drawings in which, Figure 1 is a front elevation of my device in cabinet form showing a plurality of receivers associated individually with bins.

Figure 2 is a front elevation of a slightly modified form designed particularly for dispensing vegetables or relatively large articles.

Figure 3 is a detail view of one of the feed elements used in the form shown in Figure 2.

Figure 4 is a detail view of the discharge valve used in the form shown in Figure 2.

Figure 1:
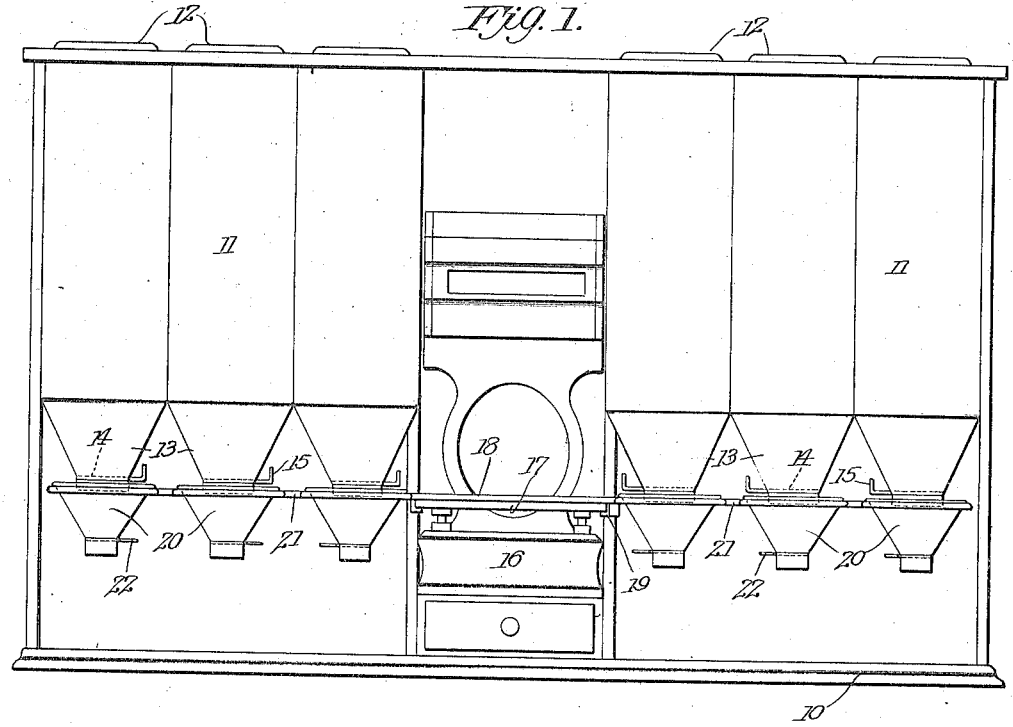
Figure 6:
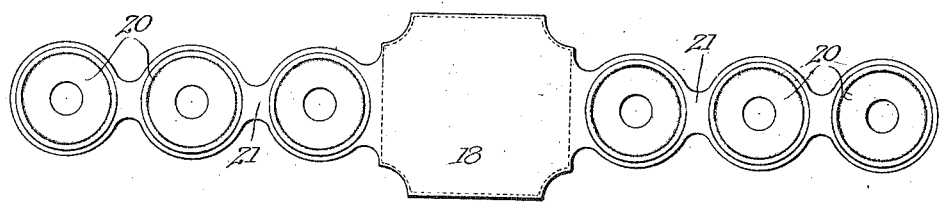
Figure 6 is a detail view showing the type of cut-off valve used in Figures 1 and 5.

Referring more particularly to the drawings, and especially the form shown in Figure 1, the numeral 10 designates a rectangular cabinet within which are secured bins 11 which are similar in size and shape and which are provided with any suitable filling openings which in actual practice preferably have open tops normally closed by suitable covers 12 which are hinged or sliding and which would naturally be provided with suitable handles and catch devices. These bins are formed hopper-shape at their lower end, as indicated at 13, and they terminate at the intermediate portion of the cabinet. Located within the lower portions of the hopper-shaped ends are cut-off valves 14 which are here illustrated as being hinged plates provided with suitable handles 15.

Located at the central portion of the cabinet and resting upon the bottom thereof, is a scale 16 of the well known calculating or computing type and including a platform 17. Carried by the platform and detachably mounted thereon, is a plate 18, which is held in position by movable catches 19 and carried by this plate are oppositely extending series of hopper-shaped receivers 20 which are identical in size and shape and which may be connected by arms 21 or the like or which may be secured together in edge to edge relation and braced by any preferred means. These receivers are located beneath the respective bins and terminate considerably above the bottom of the cabinet whereby to permit the insertion of paper bags, boxes, or in fact any desired receptacle beneath the receivers. The bottoms of the receivers are provided with cut-off valves 22 similar to the valves 14 and operating in exactly the same manner.

In the operation of the device, whenever it is desired to dispense a certain commodity contained in any one of the bins, the valve 14 of this bin is opened to permit the contents to flow into the associated receiver 20, the weight being of course indicated by the scale 16. When the desired quantity has been allowed to pass into the receiver, the valve 14 is closed and the receptacle is placed beneath the receiver and the valve 22 thereof is opened to permit the material to pass into the receptacle.

In Figure 2 I have shown a slight modification though the principle involved is exactly the same. In this form I have shown only two bins 23 which are designed particularly for containing potatoes, apples, or other similar commodities, and these bins have hopper-shaped bottoms 24 and are preferably provided in their front walls with glass covered openings 25 which permit an inspection of the interior of the bins for the purpose of ascertaining how much of the commodity remains therein. The bottom of each hopper is formed with a semi-circular opening 26 normally obstructed by a valve which includes a pivoted bar 27 terminating in a handle 28 and carrying a plurality of rods 29 which preferably terminate in knobs 30 and this valve is normally held closed by a spring 31. Located above this valve structure and within each hopper, is a feeding device consisting of a shaft 32 having a crank handle 33 and provided with a plurality of spirally arranged feed bins 34.

The numeral 35 designates a computing scales mounted between the bins and including the usual platform 36 upon which is detachably secured a plate 32, by means of a hook 38 and catch 39, respectively. Extending from opposite sides of this plate are arms 40 which carry hopper-shaped receivers 41 located beneath the open bottoms of the bins and provided with pivoted cut-off valves 42 similar to the valves of the first described form of the invention.

In the operation of this form of the device, whenever it is desired to dispense a commodity in either of the bins, it is first necessary to swing the valve comprised by the parts 27 to 30, inclusive, to uncover the opening in the bottom of the bin and then to rotate the feed shaft 32 to cause the potatoes, apples, or other articles to pass out from the bin into the receiver. When the desired amount has accumulated within the receiver, as is evidenced by the sale, the valve in the bin is closed and the valve 42 of the receiver is opened to permit the material to discharge into any suitable receptacle.

Figure 5:
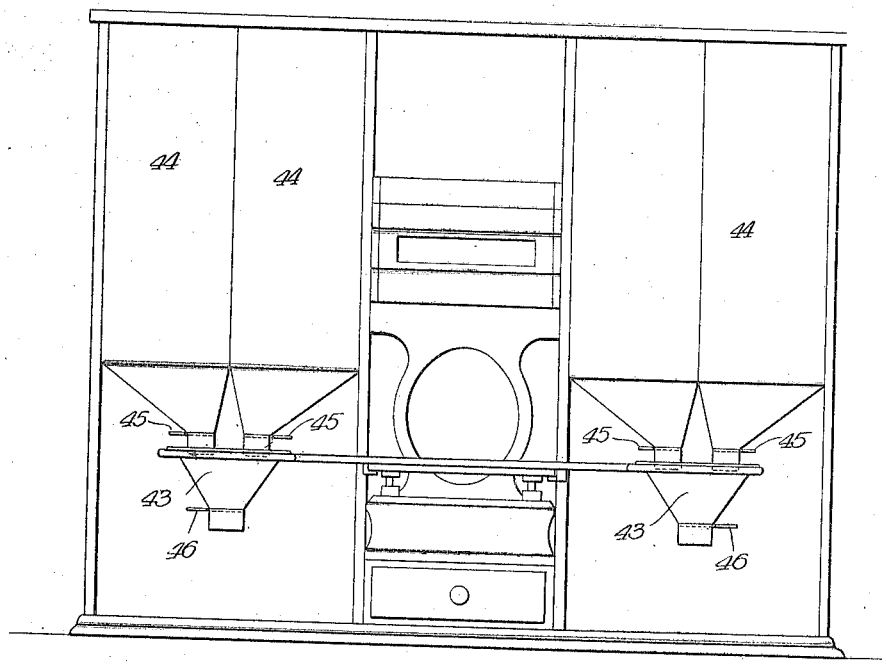
Figure 5 is a front elevation of still another form of the invention, showing a plurality of bins discharging into each receiver.

In Figure 5 I have shown still another modification in which the structure is exactly the same except that each receiver 43 has two bins 44 discharging thereinto, each bin of course being provided with a cut-off valve 45 and the receiver likewise being provided with a cut-off valve 46. The operation of this form is of course that of the other forms.

From the foregoing description and a study of the drawings it will be apparent that I have thus provided a very simply constructed and consequently inexpensive weighing device for dispensing dry material of any kind in a very rapid, efficient and economical manner, there being no waste of time and likewise no waste of material. Furthermore, it is to be noted that the goods will be protected from dust, dirt, moisture and the ravages of any insects, so that it will be kept in a perfectly marketable condition. Moreover, the device will be accurate and should therefore please the customer as well as the vendor in addition to its other meritorious qualities.

While I have shown and described the preferred embodiment of my invention, it is of course to be understood that I reserve the right to make such changes in the form, construction and arrangement of parts as will not depart from the spirit of the invention or the scope of the subjoined claims.

What is claimed is:—

1. A dispensing device comprising in combination with a computing platform scale, a plurality of receivers carried by the platform and extending therefrom, cut-off valves in the bottoms of the receivers, a plurality of commodity holding bins mounted above the receivers, and cut-off valves in the bottoms of said bin.

2. A device of the character described comprising a cabinet, a plurality of bins arranged therein and having hopper-shaped bottoms formed with openings, cut-off valves normally closing said openings, a computing platform scale located within the cabinet and dividing the bins into two series, a supporting member carried by the platform of the scale, and two series of receivers carried by said supporting member and extending at opposite sides thereof beneath the bins, said receivers having open bottoms, and cut-off valves normally closing the bottoms of the receivers.

3. A dispensing device comprising the combination with a platform computing scales, of a plate detachably mounted upon the platform and having oppositely extending arms carrying receivers, valves normally closing the bottoms of the receivers, a plurality of bins mounted above the respective receivers and having hopper-shaped open bottoms, and cut-off valves located within the open bottoms of the bins.

4. A dispensing device of the character described comprising in combination, a cabinet, a platform scales of the computing type mounted on the bottom of the cabinet at the center thereof, a plurality of bins located within the upper portion of the cabinet and arranged in two series at opposite sides of the scales, a plate mounted upon the platform of the scales, a plurality of receivers arranged in series at opposite sides of and carried by said plate and located beneath the bins, and cut-off valves normally closing the bottoms of the receivers and bins.

5. A dispensing device of the character described comprising in combination, a cabinet, a platform scales of the computing type mounted on the bottom of the cabinet at the center thereof, a plurality of bins located within the upper portion of the cabinet and arranged in two series at opposite sides of the scales, a plate mounted upon the platform of the scales, a plurality of receivers arranged in series at opposite sides of and carried by said plate and located beneath the bins, and cut-off valves normally closing the bottoms of the receivers and bins, said plate being detachably mounted upon the platform by means of a hook and catch mechanism.

In testimony whereof I affix my signature.

JAMES M. JAMES.